US010782203B2

(12) United States Patent
Pillar

(10) Patent No.: US 10,782,203 B2
(45) Date of Patent: Sep. 22, 2020

(54) METHODS AND SYSTEMS FOR LEAK DETECTION

(71) Applicant: THE BOEING COMPANY, Chicago, IL (US)

(72) Inventor: Gregory Andrew Pillar, Chesterfield, MO (US)

(73) Assignee: The Boeing Company, Chicago, IL (US)

(*) Notice: Subject to any disclaimer, the term of this patent is extended or adjusted under 35 U.S.C. 154(b) by 335 days.

(21) Appl. No.: 15/941,507

(22) Filed: Mar. 30, 2018

(65) Prior Publication Data

US 2019/0301966 A1   Oct. 3, 2019

(51) Int. Cl.
*G01M 3/20* (2006.01)
*B64D 37/06* (2006.01)
*B64D 37/32* (2006.01)

(52) U.S. Cl.
CPC ............... *G01M 3/20* (2013.01); *B64D 37/06* (2013.01); *B64D 37/32* (2013.01)

(58) Field of Classification Search
CPC .......... G01M 3/20; B64D 37/06; B64D 37/32
See application file for complete search history.

(56) References Cited

U.S. PATENT DOCUMENTS

| 3,809,898 | A  |   | 5/1974  | Fries |
|---|---|---|---|---|
| 3,856,465 | A  |   | 12/1974 | Lipscomb |
| 4,117,333 | A  | * | 9/1978  | John, Jr. ................. G21C 17/07 250/380 |
| 4,791,805 | A  | * | 12/1988 | Gates .................... G01M 3/226 73/40.7 |
| 4,976,136 | A  | * | 12/1990 | Willan .................... G01M 3/20 73/40.7 |
| 6,765,221 | B2 | * | 7/2004  | Elder ....................... A63H 3/26 250/506.1 |
| 7,984,877 | B2 |   | 7/2011  | Hasmann |
| 2015/0090007 | A1 |   | 4/2015  | Redman et al. |
| 2017/0088289 | A1 |   | 3/2017  | Tovazzi |

* cited by examiner

*Primary Examiner* — Rodney A Bonnette
(74) *Attorney, Agent, or Firm* — Armstrong Teasdale LLP

(57) ABSTRACT

A method of detecting a leak source within a tank includes coupling a first seal member to an external surface of the tank around an external leak location and coupling a second seal member to the external surface around a perimeter of the first seal member to define a gap between the first seal member and the second seal member. The method also includes coupling a sealing membrane to the first and second seal members such that a first cavity is at least partially defined within the perimeter of the first seal member and such that a second cavity is at least partially defined between the first seal member and the second seal member. The gap at least partially defines the second cavity. The method further includes applying a vacuum to the second cavity and injecting a detectable gas into the first cavity.

20 Claims, 4 Drawing Sheets

METHODS AND SYSTEMS FOR LEAK DETECTION

BACKGROUND

The field of the disclosure relates to systems and methods for detecting a leak in a tank, and in particular, to methods and systems for detecting leaks in integral fuel tanks of aircraft.

At least some known aircraft use integral tank systems that use the metallic or composite airframe structure to both define the general shape of the aircraft and to hold a volume of fuel without the use of secondary bladder to isolate the fuel from the aircraft structure. During manufacturing of such aircraft a number of techniques are used to provide a sealed interface between structural members to prevent leaks and to form a joint will last the life of the aircraft. However, in some cases, leaks occur within the structure and a leak may present itself on the external surface of the aircraft. Because of the complex configuration of the aircraft, the external evidence of the leak may be a considerable distance away from the actual internal leak source.

It would be desirable to have method and systems that take into account at least some of these issues discussed above, as well as other possible issues. It would be desirable to have a method of detecting leaks in integral fuel tanks of aircraft.

BRIEF DESCRIPTION

In one aspect, a method of detecting a leak source in a tank having an external leak location. The method includes coupling a first seal member to an external surface of the tank about the external leak location and coupling a second seal member to the external surface around a perimeter of the first seal member to define a gap between the first seal member and the second seal member. The method also includes coupling a sealing membrane to the first and second seal members such that a first cavity is at least partially defined within the perimeter of the first seal member, and such that a second cavity is at least partially defined between the first seal member and the second seal member, wherein the gap at least partially defines the second cavity. The method further includes applying a vacuum to the second cavity and injecting a detectable gas into the first cavity.

In another aspect, a leak detection system is provided. The leak detection system includes a tank comprising an external surface including an external leak location and a first seal member coupled to the external surface about the external leak location. A second seal member is coupled to the external surface around a perimeter of the first seal member to define a gap between the first seal member and the second seal member. The system also includes a sealing membrane coupled to the first seal member to at least partially define a first cavity and coupled to the second seal member to at least partially define a second cavity. A vacuum system is coupled in flow communication with the second cavity and configured to apply a vacuum to the second cavity, and a gas system coupled in flow communication with the first cavity and configured to inject a detectable gas into the first cavity.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

It would be desirable to have method and systems that take into account at least some of these issues discussed above, as well as other possible issues. It would be desirable to have a method of detecting leaks in integral fuel tanks of aircraft.

DETAILED DESCRIPTION

The implementations described herein include methods and systems for detecting a leak source in a tank having an external leak location. The method includes coupling a first seal member to an external surface of the tank about the external leak location and coupling a second seal member to the external surface about a perimeter of the first seal member to define a gap therebetween. The seal members are formed from flexible material and are conform to the contour of the exterior surface of the tank. The method also includes coupling a sealing membrane to the first and second seal members such that a first cavity defined by the first seal member, the sealing membrane, and the tank surface, and such that a second cavity is defined by the first seal member, the second seal member, the sealing membrane, and the tank surface. The method further includes applying a vacuum to the second cavity to supplement the seal between the seal members and the tank surface. A detectable gas, such as helium, is then injected into the first cavity to create a pressurized volume of the detectable gas with sufficient differential pressure to the open integral tank, that the detectable gas will follow the leak path and is detectable by a gas sensor at the leak source.

The leak detection system described herein provides a customizable way to apply gas pressure volume for leak detection to the exterior of an integral tank without requiring rigid tooling specific to that aircraft model and area of curvature, or more localized methods, either of which may lack the seal integrity required to avoid false positives in sensitive sensing systems. More specifically, the leak detection system described herein enables the use of standard available composite layup consumables and a specific bagging and sealing technique to apply a pressurized detectable gas supply on a curved exterior of an aircraft in a quick and inexpensive fashion to facilitate a flow of a detectable gas down one or more leak path(s) and permits identification of the leak source location on the integral tank interior, thus enabling the most robust corrective measures. As used herein, the term "leak source" is intended to mean a location within the integral fuel tank where a leak between two structures originates. Similarly, the term "external leak location" is the point on the exterior of the aircraft where the leak is observed, for example, by visual inspection (e.g., fuel drip/stain). As described herein, because of the complex configuration of the internal structures that form the integral fuel tank of the aircraft, the external evidence of the leak may be a considerable distance away from the actual internal leak source. Specifically, the fuel within the tank can travel from the leak source, along a leak path, and out the external leak location.

Figure 1:
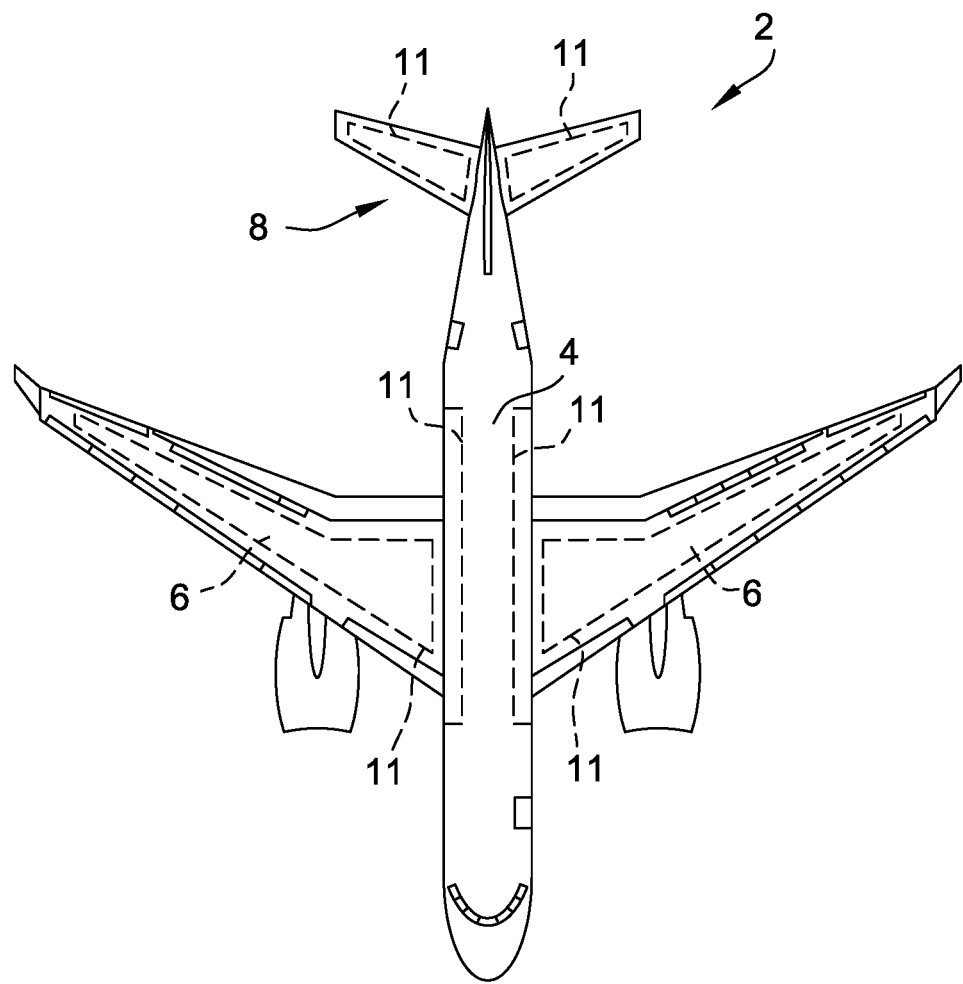
FIG. 1 is a top view of an aircraft having integral fuel tanks in accordance with an illustrative embodiment.

FIG. 1 is a top view of an aircraft 2 having integral fuel tanks 11 in accordance with an illustrative embodiment. Aircraft 2 includes a fuselage 4, a pair of wings 6, and a tail empennage 8. In an embodiment, any of fuselage 4, wings 6, and tail empennage 8 includes at least one integral fuel tank 11 that holds a predetermined volume of fuel within the structure itself and not separated from the fuselage 4, wings 6, and tail empennage 8 structure by a bladder. For example, in implementations where fuel is held within wings 8, aircraft 2 is said to be a wet wing aircraft.

Figure 2:
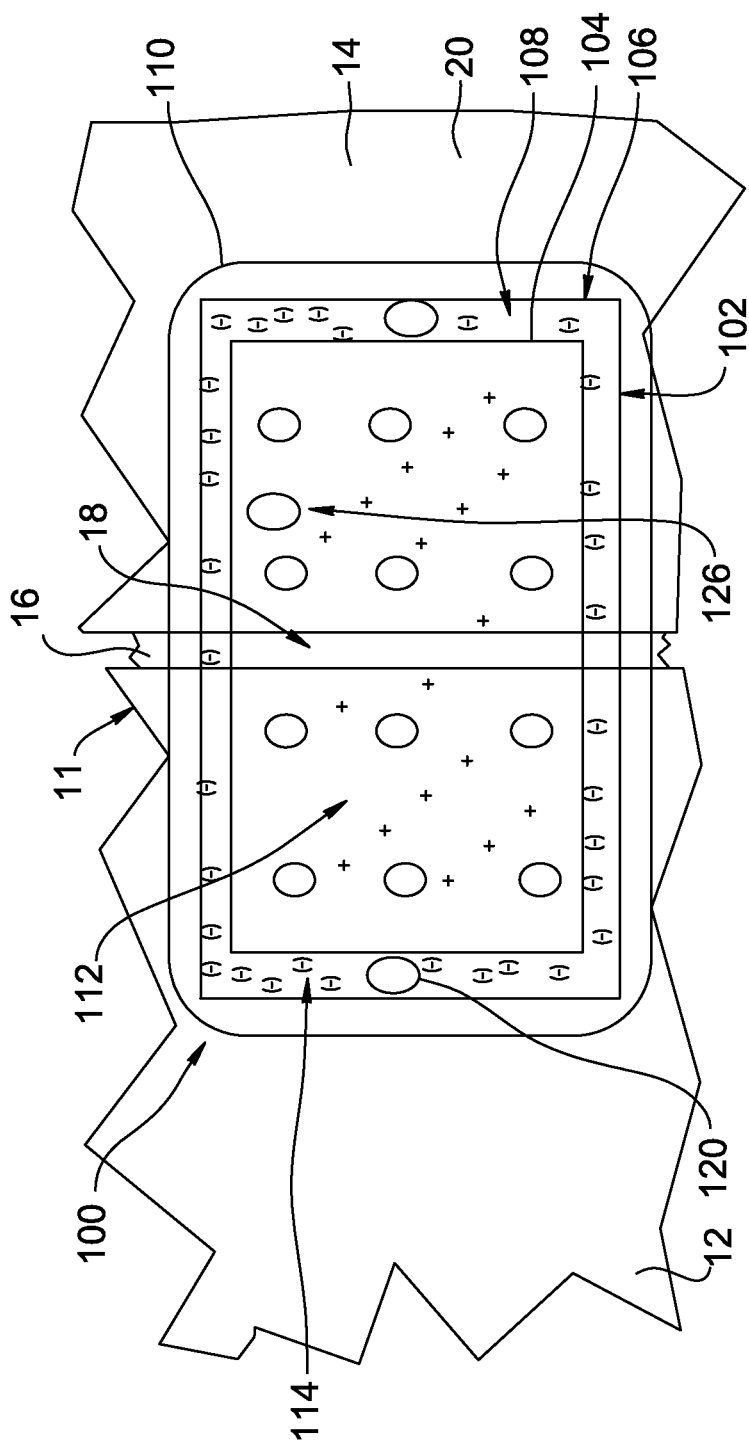
FIG. 2 is a top view of an exemplary leak detection system illustrating a tank and a sealing assembly in accordance with an illustrative embodiment.
Figure 3:
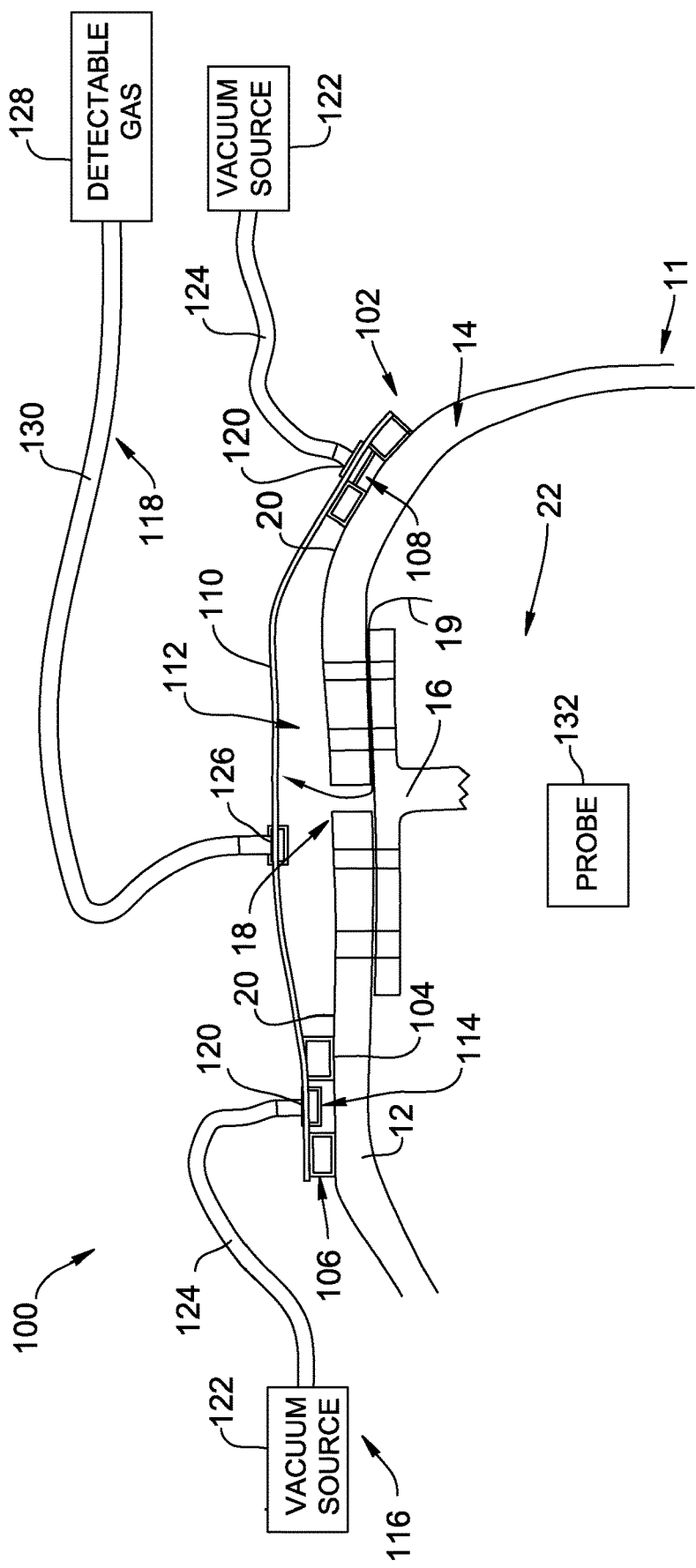
FIG. 3 is a cross-sectional side view of the leak detection system shown in FIG. 1 in accordance with an illustrative embodiment.

FIG. 2 is a top view of a portion of aircraft 2 and an exemplary leak detection system 100. FIG. 3 is a cross-sectional side view of leak detection system 100 coupled to aircraft. More specifically, leak detection system 100 is coupled to a portion of aircraft that at least partially defines fuel tank 11 of aircraft 2. In the illustrated implementation, tank 11 is an integral fuel tank of aircraft 2 and may be any of tanks 11 (shown in FIG. 1) of fuselage 4, wings 6 (also known as a wet wing), or empennage 8. Alternatively, tank 11 may be any type of tank meant to store a fluid. As best shown in FIG. 2, tank 11 includes a first panel 12, a second panel 14, and a substructure 16 that couples panels 12 and 14 together such that a seam 18 is formed therebetween. Panels 12 and 14 are operable as the exterior skin of aircraft 2 and substructure 16 is operable as the stiffening structure between adjacent panels 12 and 14. For example, in embodiments where fuel tank 11 comprises a wet wing of aircraft 2, panels 12 and 14 are exterior skin panels and substructure 16 is a wing spar. In one implementation, panels 12 and 14 are formed from a composite material (e.g., carbon or boron fibers embedded in epoxy resin) having a plurality of plies. In another implementation, panels 12 and 14 are formed from a metallic material. Panels 12 and 14 define an external surface 20 of tank 11 and combine with substructure 16 to define an interior 22 of tank 11. In the illustrated implementation, external surface 20 includes an external leak location at seam 18 around which leak detection system 100 is assembled, as described herein. More specifically, one of panels 12 and 14 or substructure 16 may shift or a sealing mechanism (not shown) may deteriorate and cause fuel from within tank 11 to leak through seam 18 and be observable by a technician during a visual inspection of aircraft 2 as a wet spot on the external surface 20. Although described herein at seam 18, the external leak location may be at a location of fasteners extending through panels 12 and 14. Generally, use of the leak detection system 100 is not limited to use with leaks at seam 18 and may be used with any boundary feature of tank 11 that defines interior 22.

In an embodiment, leak detection system 100 may be used to identify a leak in the aircraft 2 shown in FIG. 1. Leak detection system 100 includes a seal assembly 102 coupled to external surface 20 such that seal assembly 102 circumscribes the leak location at seam 18. More specifically, seal assembly 102 is attached to external surface 20 using an independent adhesive (not shown), or seal assembly 102 is formed from a material that self-adheres to external surface 20 such that seal assembly 102 forms an air-tight seal with external surface 20. Seal assembly 102 includes a first seal member 104 coupled to external surface 20 around the leak location on seam 18 and a second seal member 106 coupled to external surface 20 around a perimeter of first seal member 104 such that a gap 108 is defined between first seal member 104 and second seal member 106. As best shown in FIG. 2, gap 108 extends around an entire perimeter of first seal member 104. Although seal members 104 and 106 are shown in FIG. 2 as concentric rectangles defining a constant width of gap 108, it is contemplated that seal members 104 and 106 may be any desired shape. Moreover, in some implementations, first seal member 104 is a different shape than second seal member 106 such that gap 108 does not define a constant width around the perimeter of first seal member 104.

In an implementation, seal members 104 and 106 are formed from a flexible material that facilitates coupling seal members 104 and 106 to external surface 20 have varying contours, such as, for example, a curved contour as shown in FIG. 3. More specifically, seal members 104 and 106 are formed from at least one of a plurality of layers of adhesive tape and a flexible tubular material. Alternatively, seal members 104 and 106 are formed from any material that facilitates operation of leak detection system 100 as described herein. Moreover, in one implementation, seal members 104 and 106 are removably coupled to external surface 20 and may use an adhesive (not shown) to attach thereto. Seal members 104 and 106 and the adhesive, when used, are impermeable to gas at or near ambient pressures to prevent a fluid from leaking therethrough (e.g., create a hermetic seal). Additionally, in one implementation, first seal member 104 is formed from a first flexible material and second seal member 106 is formed from a second, different flexible material. Generally, seal members 104 and 106 are formed from a flexible material capable of conforming to the contours of the external surface 20 of tank 11 and capable of conforming to the outline of the area of external surface 20 of tank 11 to be tested.

Leak detection system 100 also includes a sealing membrane 110 coupled to seal assembly 102 to at least partially define a first cavity 112 and a second cavity 114 between sealing membrane 110 and seal assembly 102. More specifically, sealing membrane 110 is laid over first seal member 104 and second seal member 106 such that sealing membrane 110 completely covers the area within first seal member 104 and the area of gap 108. Sealing membrane 110 is coupled to seal members 104 and 106 using any known method such that first cavity 112 is defined by external surface 20, sealing membrane 110, and first seal member 104. Similarly, second cavity 114 is defined by external surface 20, sealing membrane 110, first seal member 104, and second seal member 106. As shown in FIGS. 2 and 3, second cavity 114 may have a width equal to gap 108 and completely circumscribes first cavity 112.

In an embodiment, leak detection system 100 also includes a vacuum system 116 and a gas injection system 118. Vacuum system 116 is coupled in flow communication with second cavity 114 and removes air from second cavity 114 to apply a vacuum to second cavity 114. More specifically, vacuum system 116 includes a vacuum port 120 coupled to sealing membrane 110 between first seal member 104 and second seal member 106. A vacuum source 122 is coupled to vacuum port 120 via a vacuum conduit 124. When activated, vacuum source 122 removes air from second cavity 114 via vacuum port 120 and channels the air through conduit 124 to be discharged to the atmosphere. Although two vacuum ports 120 are shown in FIGS. 2 and 3, it is contemplated that vacuum system 116 includes any number of vacuum ports 120 to facilitate operation of vacuum system 116 as described herein.

Similarly, gas injection system 118 is coupled in flow communication with first cavity 112 and injects a detectable gas into first cavity 112 to create a volume of detectable gas under positive pressure within first cavity 112 relative to the ambient atmosphere. More specifically, gas injection system 118 includes a gas port 126 coupled to sealing membrane 110 within the perimeter of first seal member 104. A gas source 128 is coupled to gas port 126 via a gas conduit 130. When activated, gas source 128 injects the detectable gas into first cavity 112 via gas port 126. For example, the gas may be helium to facilitate the flow of gas to and through a leak path (shown as arrow 19 in FIG. 2). The gas injection system 118 injects a volume of helium gas into first cavity 112. Alternatively, gas injection system 118 uses any detectable gas that facilitates operation of leak detection system 100 as described herein. Although only a single gas port 126 is shown in FIGS. 2 and 3, it is contemplated that gas injection system 118 includes any number of gas ports 126 to facilitate operation of gas injection system 118 as described herein.

The seal between the sealing membrane 110 and seal members 104 and 106 and the seal between seal members 104 and 106 and external surface 20 are strengthened when the vacuum is applied to second cavity 114. As such, seal assembly 102 having both seal members 104 and 106 is able to withstand the positive pressure build-up of detectable gas within first cavity 112 better than if seal assembly only included first seal member 104. More specifically, second seal member 106 is used to create the vacuum to retain seal assembly 102 on external surface 20 to maintain the seal therebetween, which enables injecting first cavity 112 with the detectable gas at a sufficient gauge pressure to ensure migration of the detectable as into and through the leak path. In the illustrated implementation, detectable gas is injected into first cavity 112 to obtain approximately one atmosphere of gauge positive pressure to force the detectable gas into the leak location at seam 18. Specifically, detectable gas is injected into first cavity 112 to obtain a pressure within a range of approximately 5 pounds per square inch gauge (psig) and approximately 15 psig. Alternatively, first cavity 112 contains the detectable gas at any pressure that enables operation of leak detection system 100 as described herein.

In an embodiment, leak detection system 100 also includes a sensor 132 located within interior 22 of tank 11 capable to detecting the presence of the detectable gas within interior 22 to facilitate identifying a location of a greater concentration of detectable gas density relative to a remainder of the interior 22 within the tank 11 as the leak source. In one implementation, a technician moves sensor 132 around the internal surfaces of tank 11 to until the detectable gas is detected. Then, the technician can move sensor 132 around the identified area to find the highest density of detectable gas within interior 22. The location of the greater density of the detectable gas is identified as a possible source of the leak. As described herein, the leak source may be a considerable distance away from the external leak location at seam 18 where the leak is observed, and in the illustrated implementation, this local sensing facilitates discrete repair of the tank sealing system at the leak to enhance repair quality and maintain weight sensitivities in aircraft. In other embodiments, the process may be automated such as, for example, by coupling the sensor 132 to an end effector configured to cause the sensor 132 to move within the tank 11.

Figure 4:
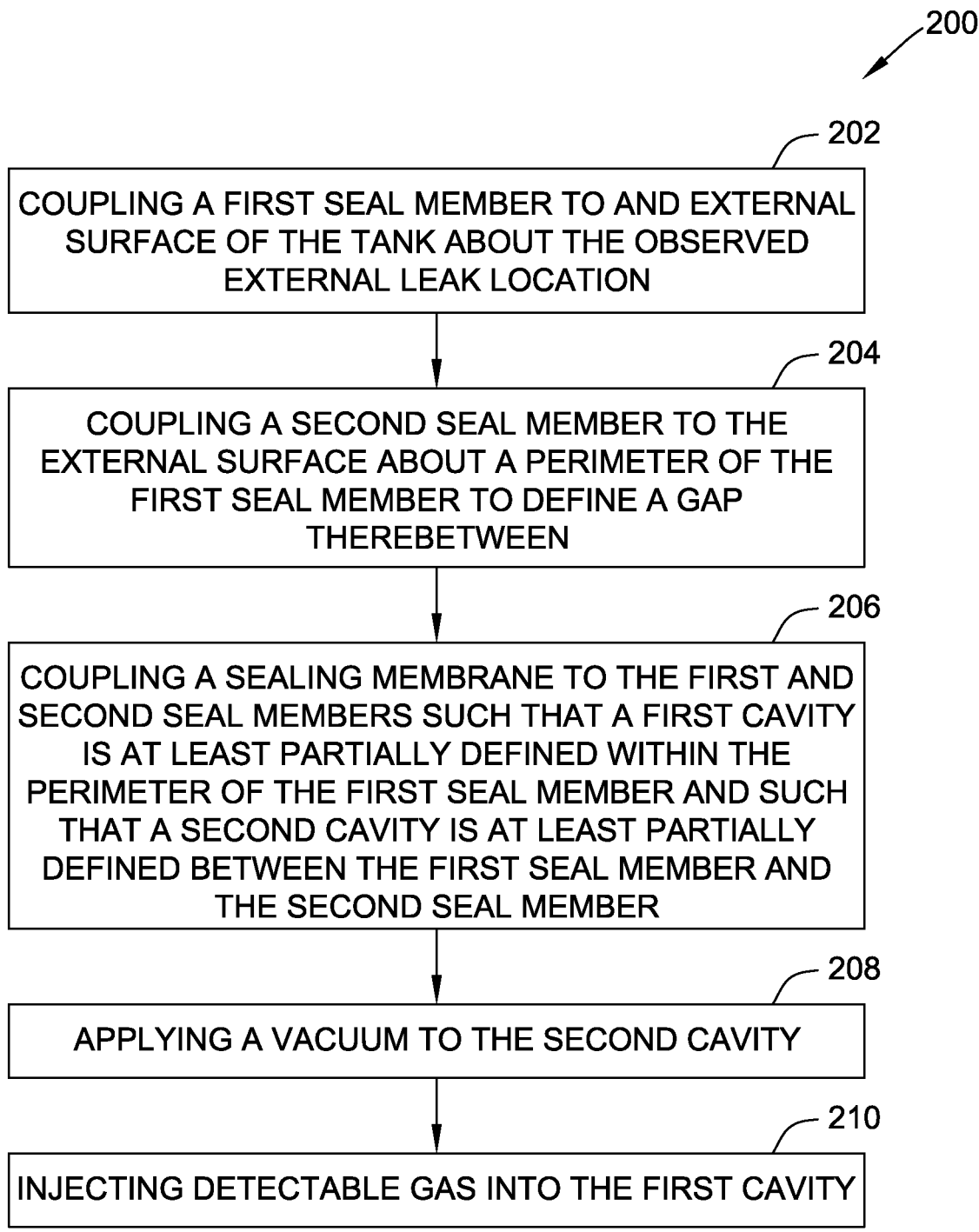
FIG. 4 illustrates a method for detecting a leak source in a tank using the leak detection system shown in FIGS. 2 and 3 in accordance with an illustrative embodiment.

FIG. 4 illustrates a method 200 for detecting a leak source in tank 11 using leak detection system 100 (shown in FIGS. 2 and 3). Method 200 includes coupling 202 first seal member 104 to external surface 20 of tank 11 around the external leak location at seam 18 and coupling 204 second seal member 106 to external surface 20 around a perimeter of first seal member 104 to define gap 108 between the first seal member 104 and the second seal member 106. Additionally, the coupling step 204 includes coupling second seal member 106 around first seal member 104 to define gap 108 that extends around the entire perimeter of first seal member 104. The coupling steps 202 and 204 include coupling a flexible first seal member 104 and a flexible second seal member 106 to external surface 20 such that first seal member 104 and second seal member 106 conform to a contour of external surface 20. For example, seal members 104 and 106 are flexible to enable coupling 202 and 204 to a curved contour of external surface 20. More specifically, the coupling steps 202 and 204 include coupling first seal member 104 and second seal member 106 made from at least one of a plurality of layers of adhesive tape and a flexible tubular material to external surface 20.

In the illustrated implementation, method 200 also includes coupling 206 sealing membrane 110 to first and second seal members 104 and 106 such that first cavity 112 is at least partially defined within the perimeter of first seal member 104 and such that second cavity 114 is at least partially defined between first seal member 104 and second seal member 106. More specifically, the coupling step 206 includes coupling sealing membrane 110 such that first cavity 112 is defined by first seal member 104, sealing membrane 110, and external surface 20. Furthermore, the coupling step 206 includes coupling sealing membrane 110 such that second cavity 114 is defined by first seal member 104, second seal member 106, sealing membrane 110, and external surface 20.

Method 200 also includes applying 208 a vacuum to second cavity 114 with vacuum system 116. The applying step 208 includes coupling at least one vacuum port 120 to sealing membrane 110 between first seal member 104 and second seal member 106 and activating vacuum source 122 to remove air from second cavity 114.

Method 200 also includes injecting 210 a detectable gas, such as but not limited to helium, into first cavity 112 with gas injection system 118. The injecting step 210 includes coupling at least one gas port 126 to sealing membrane 110 within the perimeter of first seal member 104 and activating gas source 128 to inject the detectable gas into first cavity 112 and into the external leak location at seam 18 on external surface 20. The injecting step 210 is performed after the vacuum is created in the applying step 208; however, the vacuum is maintained during the injecting step 210 such that the applying step 208 and injecting step 210 are performed concurrently.

In the exemplary implementation, method 200 also includes detecting the presence of the detectable gas within interior 22 of tank 11. The detecting step includes inserting gas sensor 132 into tank 11 and moving gas sensor 132 along the interior surfaces of tank 11 to identify a location having the greater concentration of detectable gas density relative to a remainder of the interior 22 within tank 11 as the leak source.

The leak detection system described herein provides a customizable way to apply a detectable gas pressure volume for leak detection to the exterior of an integral tank without requiring rigid tooling specific to that aircraft model and area of curvature, or more localized methods. More specifically, the leak detection system described herein enables the use of standard available composite layup consumables and a specific bagging and sealing technique to apply a pressurized detectable gas supply on a curved exterior of an aircraft in a quick and inexpensive fashion to facilitate a flow of detectable gas down one or more leak path(s) and permits identification of the leak source location on the integral tank interior, thus enabling the most robust corrective measures.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of detecting a leak source within a tank, said method comprising:
    coupling a first seal member to an external surface of the tank about an external leak location;
    coupling a second seal member to the external surface around a perimeter of the first seal member to define a gap between the first seal member and the second seal member;
    coupling a sealing membrane to the first and second seal members such that a first cavity is at least partially defined within the perimeter of the first seal member and such that a second cavity is at least partially defined between the first seal member and the second seal member, wherein the gap at least partially defines the second cavity;
    applying a vacuum to the second cavity; and
    injecting a detectable gas into the first cavity.

2. The method of claim 1, wherein coupling the first seal member and the second seal member to the external surface comprises coupling the first seal member and the second seal member to conform to a contour of the external surface.

3. The method of claim 1, wherein coupling the first seal member and the second seal member to the external surface comprises coupling a flexible first seal member and a flexible second seal member to the external surface.

4. The method of claim 1, wherein coupling the first seal member and the second seal member to the external surface comprises coupling at least one of a plurality of layers of adhesive tape and a flexible tubular material to the external surface.

5. The method of claim 1, wherein coupling the sealing membrane comprises:
    coupling the sealing membrane such that the first cavity is defined by the first seal member, the sealing membrane, and the external surface; and
    coupling the sealing membrane such that the second cavity is defined by the first seal member, the second seal member, the sealing membrane, and the external surface.

6. The method of claim 1, wherein coupling the second seal member about the first seal member to define the gap therebetween comprises coupling the second seal member about the first seal member such that the gap extends about an entire perimeter of the first seal member.

7. The method of claim 1, further comprising detecting a presence of the detectable gas within the tank.

8. The method of claim 7, wherein detecting the presence of the detectable gas comprises:
    inserting a gas sensor into the tank;
    moving the gas sensor along an interior surface of the tank; and
    identifying a location of a greater concentration of detectable gas density relative to a remainder of the interior surface within the tank as the leak source.

9. The method of claim 1, wherein injecting the detectable gas comprises:
    coupling at least one gas port to the sealing membrane within the perimeter of the first seal member; and
    activating a gas source to inject the detectable gas into the first cavity and into the external leak location.

10. The method of claim 1, wherein applying a vacuum comprises:
    coupling at least one vacuum port to the sealing membrane between the first seal member and the second seal member; and
    activating a vacuum source to remove air from the second cavity.

11. A leak detection system comprising:
    a tank comprising an external surface including an external leak location;
    a first seal member coupled to said external surface about the external leak location;
    a second seal member coupled to said external surface around a perimeter of said first seal member to define a gap between said first seal member and said second seal member;
    a sealing membrane coupled to said first seal member to at least partially define a first cavity and coupled to said second seal member to at least partially define a second cavity;
    a vacuum system coupled in flow communication with said second cavity and configured to apply a vacuum to said second cavity; and
    a gas system coupled in flow communication with said first cavity and configured to inject a detectable gas into said first cavity.

12. The leak detection system of claim 11, wherein said gap at least partially defines said second cavity.

13. The leak detection system of claim 12, wherein said first cavity is defined by said first seal member, said sealing membrane, and said external surface, and wherein said second cavity is defined by said first seal member, said second seal member, said sealing membrane, and said external surface.

14. The leak detection system of claim 13, wherein said second cavity circumscribes said first cavity.

15. The leak detection system of claim 12, wherein said gap extends about the entire perimeter of the first seal member.

16. The leak detection system of claim 11, wherein said first seal member and said second seal member comprise a flexible material.

17. The leak detection system of claim 11, wherein said external surface comprises a curved contour.

18. The leak detection system of claim 11, wherein said gas system comprises a gas port coupled to said sealing membrane and a gas source configured to inject gas into the first cavity and into the leak location.

19. The leak detection system of claim 11, wherein said vacuum system comprises a vacuum port coupled to said sealing membrane and a vacuum source configured to remove air from said second cavity.

20. The leak detection system of claim 11, further comprising a sensor within an interior of said tank, said sensor configured to detect the presence of the detectable gas within said interior to facilitate identifying a location of a greater concentration of detectable gas density relative to a remainder of the interior surface within the interior as a leak source.

\* \* \* \* \*